United States Patent
Van de Haar

(10) Patent No.: US 6,721,422 B2
(45) Date of Patent: Apr. 13, 2004

(54) OBJECT-CONDITIONAL ACCESS SYSTEM

(75) Inventor: Peter George Van de Haar, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 295 days.

(21) Appl. No.: 09/826,694

(22) Filed: Apr. 5, 2001

(65) Prior Publication Data

US 2001/0029584 A1 Oct. 11, 2001

(30) Foreign Application Priority Data

Apr. 6, 2000 (EP) .......................................... 00201254

(51) Int. Cl.[7] .......................... H04N 7/167; H04L 9/00
(52) U.S. Cl. ...................................... 380/241; 713/167
(58) Field of Search ............................... 380/241, 242, 380/232; 705/59, 58; 713/167, 164, 189

(56) References Cited

U.S. PATENT DOCUMENTS

| | | | |
|---|---|---|---|
| 5,442,701 A | 8/1995 | Guillou et al. | ................. 380/20 |
| 6,256,393 B1 * | 7/2001 | Safadi et al. | ................. 380/232 |
| 6,516,412 B2 * | 2/2003 | Wasilewski et al. | ......... 713/168 |
| 6,526,508 B2 * | 2/2003 | Akins et al. | ................. 713/168 |

FOREIGN PATENT DOCUMENTS

| | | |
|---|---|---|
| EP | 0766471 A1 | 12/1995 |
| EP | 1021043 A2 | 3/1999 |

OTHER PUBLICATIONS

Jack Lacy, Niels Rump, Panos Kudumakis, "PEG–4 Intellectual Property Management & Protection (IPMP)", Dec. 1998.

* cited by examiner

Primary Examiner—Matthew Smithers

(57) ABSTRACT

Conditional access system for controlling the access of receivers of end-users to a data content source in an uplink system. Said uplink system comprises a scrambler for scrambling data content supplied from the data content source, an entitlement control message generator for generating entitlement control messages containing a control word and an entitlement identification and a transmitter for transmitting the scrambled data content and the entitlement control messages. A descrambler and an entitlement control message decoder are associated to the receiver. If a match between the entitlement in the entitlement control message and the entitlement of the end-user exists, the entitlement control message decoder supplies a control word to the descrambler for descrambling a part of the received scrambled content for which the receiver is entitled. A separator is coupled to the data content source for separating a part of the data content from said source into at least one object data stream representing a preselected object of the data content part and a remaining data stream representing the data content part without the object data. The at least one object data stream is supplied to the input of the scrambler. A combiner is connected to the output of the descrambler for combining the descrambled object data with the remaining data content. An individual entitlement is allocated to said object.

7 Claims, 1 Drawing Sheet

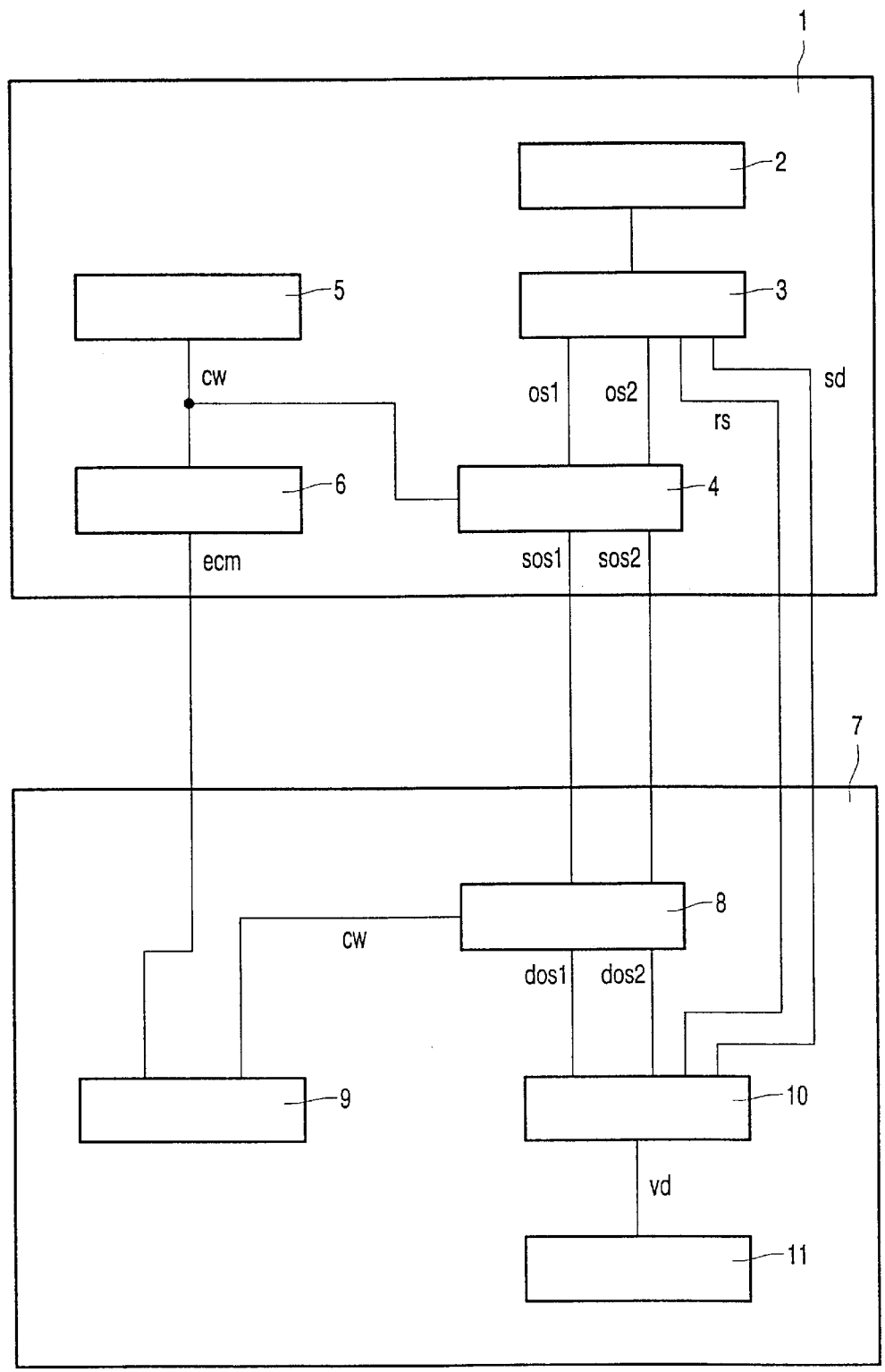

OBJECT-CONDITIONAL ACCESS SYSTEM

The invention relates to a conditional access system for controlling the access of receivers of end-users to a data content source in an uplink system, said uplink system comprising a scrambler for scrambling data content supplied from the data content source, an entitlement control message generator for generating entitlement control messages containing a control word and an entitlement identification and a transmitter for transmitting the scrambled data content and the entitlement control messages, in which a descrambler, and an entitlement control message decoder are associated to the receiver, and in which if a match between the entitlement in the entitlement control message and the entitlement of the end-user exists, the entitlement control message decoder supplies a control word to the descrambler for descrambling a part of the received scrambled content for which the receiver is entitled.

The invention further relates to an uplink system for use in such a conditional access system.

The invention further relates to a receiver for use in such a conditional access system.

Such a conditional access system is known from the article "Functional model of a conditional access system, published in EBU Technical Review, Winter 1995, No. 266, pages 64–77.

In present access systems a user pays access to an integral part of data content (e.g. a football match) and otherwise gets to receive nothing. The entitlement of the user is allocated to the integral part of the data content. Current conditional access systems provide for several types of entitlements to give access to services from a provider, which entitlements relate to the way of payment of the services.

The invention, however, has the object to draw the attention of the users more directly to the possibility of receiving an integral part of the data content, in order to stimulate the users to buy said data content part.

This object is achieved by the invention in that a separator is provided, coupled to the data content source for separating a part of the data content from said source into at least one object data stream representing a preselected object of the data content part and a remaining data stream representing the data content part without the object data, that the at least one object data stream is supplied to the input of the scrambler and that a combiner is connected to the output of the descrambler for combining the descrambled object data with the remaining data content, in which an individual entitlement is allocated to said object.

An integral part of the data content is analyzed to separate an essential object from the remainder of said integral part, e.g. the ball in the scene of a football match. In the broadcast signal to the user, this essential object is identified as being a separate object. This essential object is given a separate conditional access code, so that an individual entitlement is allocated to the object. For example the user is able to receive the remainder of the integral part of the data content for free, i.e. the remainder of the football match without the ball. By viewing the football match without a ball the viewer is stimulated to pay to see the complete scene.

It is observed, that in U.S. Pat. No. 5,442,701 the video signal is adapted in quality on analogue or digital level, in order to have a video signal with semi-quality. This adaptation is completely independent of the football scene. According to the invention, however, a scene adaptation is implemented by separating an essential object (such as a ball). Moreover, the invention has the advantage that the remainder of the integral part has a good quality and thus a more professional appearance, so that the user will be stimulated more to pay for a complete integral part of the data content (the complete football match).

The semi-quality version of the football match seems to be unusable. In the conditional access system according to the invention the remainder part of the data content is not unusable. For example, the conditional access system according to the invention could be generalized to programs consisting of more levels of conditional access (more tariff levels), in which the lowest (free of charge) could be worthwhile. It is referred for example to an electronic news paper having a basis level free of charge (see teletext), while you have to pay for in-depth information, photographs and so on.

The invention will be explained further by reference to the enclosed FIGURE showing the architecture of a preferred embodiment of a conditional access system according to the invention.

In general, in conditional access systems one could distinguish among others a service and an event.

A service is a sequence of programs under the control of a broadcaster which can be broadcasted as part of a schedule. The service is the central reference entity.

An event is a grouping of elementary broadcast data streams with a defined start and end time belonging to a common service, e.g. a football match, news flash, an entertainment show and so on. An event is always part of one and only one service, i.e. one event cannot be part of multiple services.

According to the invention a part of data content (event) from a data content source is separated into at least one object data stream representing a pre-selected object of the data content part and a remaining data stream representing the data content part without the object data. The at least one object data stream is scrambled and transmitted to several users. If a user has paid for the complete part of the data content, in particular for the object, the remaining data stream and the at least one object data stream are combined An individual entitlement is thus allocated to the object.

In the FIGURE an example of a so-called object-conditional access system according to the invention is shown and will be described with reference to a football match as an event.

Please note that the object-conditional access system could be used not only in digital television broadcasting systems but also in video systems over internet protocol.

The uplink system 1 of the conditional access system shown in the FIGURE comprises a data content source 2. A part of the data content could be video data concerning a football match. Said part of the data content is supplied to a separator 3, which separates the video data in at least one object data stream os1, os2 representing a pre-selected object of the video data and a remaining data stream rs representing the video data without the object data. In the example of a football match the first object could be the football and the second object could be the audio comment concerning the football match. The first and second object data streams os1, os2 are connected to the scrambler 4 for scrambling both of the object data, so that an entitled user cannot receive said object data.

Furthermore, the uplink system 1 comprises a control word generator 5 delivering a control word cw supplied to the scrambler 4 for controlling the scrambling operation of said scrambler. In addition the control word cw is supplied to the entitlement control message generator 6 for generating entitlement control messages ecm containing the control word and an entitlement identification.

The entitlement control messages ecm, the scrambled object data signals sos1, sos2 as well as the remaining data stream rs are transmitted or broadcast to receivers 7 of several potential users. Please note that the remaining data stream is transmitted directly from the separator 3 and not via the scrambler 4. However, it is also possible to scramble the remaining data stream rs.

The receiver 7 comprises a descrambler 8 and an entitlement control message decoder 9.

The entitlement control messages are received by the decoder 9 and if the user of the receiver 7 is entitled to receive the object(s) data a control word cw is delivered to the descrambler 8. By said control word the descrambler 8 is controlled such that the object(s) data is descrambled and fed to the combiner 10. The descrambled object data signals dos1, dos2 and the remaining data rs are combined in the combiner 10 in order to present completed video data vd to the data sink 11.

The separator 3 generates scene description data sd, which is transmitted to the receiver 7 and received by the combiner 10. Based on said scene description data sd the object data and remaining data are combined into the completed video data vd.

In the embodiment shown in the FIGURE, each user could receive the remaining video data by means of his receiver 7, so that he can see the remainder of the scene without any charge. Preferable data representing a readable persuasive indication is added to the remaining data, so that the viewer can for instance see the indication "buy the ball".

If the user is persuaded and has bought the ball, he is entitled to receive the data concerning the ball. Then a matching occurs between the entitlement of the user and the entitlement in the entitlement control message. Based on said matching the entitlement control message generator 9 decodes said message in order to deliver the control word cw, which is applied to the descrambler 8 in order to descramble the object data.

By separating an object, for example a ball from the video data, video frames are caused having a cut out portion in form of the ball. Such a cut out portion is preferably filled up with information of preceding and/or following video frames at the location of said object, so that the ball location is reconstructed.

In known conditional access systems a protocol is used for buying the entitlement to receive video/audio objects and to decode it. The management of the entitlements is conducted by means of transmitting and receiving so called entitlement management messages.

Preferable the entitlement control messages and entitlement management messages are encrypted, for which smart cards could be used.

The data content source could comprise programs consisting of a basis level of information and several levels of in-depth information. The basis level of information could be accessed free of charge, whereas the levels of in-depth information could be accessed by paying several amounts and are associated with individual entitlements.

What is claimed is:

1. Conditional access system for controlling the access of receivers (7) of end-users to a data content source (2) in an uplink system (1), said uplink system comprising a scrambler (4) for scrambling data content supplied from the data content source (2), an entitlement control message generator (6) for generating entitlement control messages (ecm) containing a control word (cw) and an entitlement identification and a transmitter for transmitting the scrambled data content and the entitlement control messages, in which a descrambler (8), and an entitlement control message decoder (9) are associated to the receiver (7), and in which if a match between the entitlement in the entitlement control message (ecm) and the entitlement of the end-user exists, the entitlement control message decoder (9) supplies a control word (cw) to the descrambler (8) for descrambling a part of the received scrambled content for which the receiver is entitled, characterized in that a separator (3) is provided, coupled to the data content source (2) for separating a part of the data content from said source into at least one object data stream (os1) representing a preselected video object of the data content part and a remaining data stream (rs) representing the data content part without the preselected video object, that the at least one object data stream is supplied to the input of the scrambler (4) and that a combiner (10) is connected to the output of the descrambler (8) for combining the descrambled object data (dos1, dos2) with the remaining data content (rs), in which an individual entitlement is allocated to said object.

2. Conditional access system according to claim 1, wherein each of the objects is related to a predetermined level of in-depth information.

3. Conditional access system for controlling the access of receivers (7) of end-users to a data content source (2) in an uplink system (1), said uplink system comprising a scrambler (4) for scrambling data content supplied from the data content source (2), an entitlement control message generator (6) for generating entitlement control messages (ecm) containing a control word (cw) and an entitlement identification and a transmitter for transmitting the scrambled data content and the entitlement control messages, in which a descrambler (8), and an entitlement control message decoder (9) are associated to the receiver (7), and in which if a match between the entitlement in the entitlement control message (ecm) and the entitlement of the end-user exists, the entitlement control message decoder (9) supplies a control word (cw) to the descrambler (8) for descrambling a part of the received scrambled content for which the receiver is entitled, characterized in that a separator (3) is provided, coupled to the data content source (2) for separating a part of the data content from said source into at least one object data stream (os1) representing a preselected object of the data content part and a remaining data stream (rs) representing the data content part without the object data, that the at least one object data stream is supplied to the input of the scrambler (4) and that a combiner (10) is connected to the output of the descrambler (8) for combining the descrambled object data (dos1, dos2) with the remaining data content (rs), in which an individual entitlement is allocated to said object, wherein the part of the data content comprises video frames and the preceding and/or following video frames are used for reconstructing the frame portion cut out by separating the object.

4. Conditional access system according to claim 1, wherein scene description data (sd) is transmitted from the separator (3) to the combiner (10), according to which the object data is combined with the remaining data.

5. Conditional access system for controlling the access of receivers (7) of end-users to a data content source (2) in an uplink system (1), said uplink system comprising a scrambler (4) for scrambling data content supplied from the data content source (2), an entitlement control message generator (6) for generating entitlement control messages (ecm) containing a control word (cw) and an entitlement identification and a transmitter for transmitting the scrambled data content and the entitlement control messages, in which a descrambler (8), and an entitlement control message decoder (9) are associated to the receiver (7), and in which if a match between the entitlement in the entitlement control message (ecm) and the entitlement of the end-user exists, the entitlement control message decoder (9) supplies a control word (cw) to the descrambler (8) for descrambling a part of the received scrambled content for which the receiver is entitled, characterized in that a separator (3) is provided, coupled to the data content source (2) for separating a part of the data content from said source into at least one object data stream (os1) representing a preselected object of the data content part and a remaining data stream (rs) representing the data content part without the object data, that the at least one object data stream is supplied to the input of the scrambler (4) and that a combiner (10) is connected to the output of the descrambler (8) for combining the descrambled object data (dos1, dos2) with the remaining data content (rs), in which an individual entitlement is allocated to said object, wherein data representing a readable persuasive indication is added to the remaining data content.

6. Uplink system (1) suitable for a conditional access system according to claim 1, comprising a data content source (2), a scrambler (4) for scrambling at least a part of the data content from the data content source (2), an entitlement control message generator (6) for generating entitlement control messages (ecm) containing a control word (cw) and an entitlement identification and a transmitter for transmitting the scrambled data content and the entitlement control messages, wherein a separator (3) is provided, coupled to the data content source (2) for separating a part of the data content from said source into at least one object data stream (os1, os2) representing a preselected video object of the data content part and a remaining data stream (rs) representing the data content part without the preselected video object, in which the at least one object data stream is supplied to the input of the scrambler.

7. Receiver (7) suitable for a conditional access system according to claim 1, comprising a descrambler (8), and an entitlement control message decoder (9), wherein a combiner (10) is connected to the output of the descrambler (8) for combining the descrambled object data (dos1, dos2) with the remaining data content (rs), in which an individual entitlement is allocated to said object.

* * * * *